(12) United States Patent
Morino et al.

(10) Patent No.: US 10,935,088 B2
(45) Date of Patent: Mar. 2, 2021

(54) VEHICLE DRIVING DEVICE

(71) Applicant: TOYOTA JIDOSHA KABUSHIKI KAISHA, Toyota (JP)

(72) Inventors: Takuro Morino, Numazu (JP); Yoshio Ito, Susono (JP); Tomoaki Yanagida, Susono (JP); Kenta Kimura, Susono (JP); Yu Nagasato, Susono (JP); Takuya Hirata, Susono (JP); Tomoe Osada, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 689 days.

(21) Appl. No.: 15/017,443

(22) Filed: Feb. 5, 2016

(65) Prior Publication Data

US 2016/0230821 A1 Aug. 11, 2016

(30) Foreign Application Priority Data

Feb. 6, 2015 (JP) ............... JP2015-021692

(51) Int. Cl.

| F16H 61/662 | (2006.01) |
| B60W 10/02 | (2006.01) |
| F16D 48/02 | (2006.01) |
| B60W 30/18 | (2012.01) |
| F16H 61/00 | (2006.01) |
| F16H 59/18 | (2006.01) |

(52) U.S. Cl.
CPC ....... *F16D 48/02* (2013.01); *B60W 30/18072* (2013.01); *F16H 61/0021* (2013.01); *F16H 61/0028* (2013.01); *B60Y 2300/18083* (2013.01); *B60Y 2300/42* (2013.01); *B60Y 2400/427* (2013.01); *F16D 2048/0227* (2013.01); *F16D 2500/3108* (2013.01); *F16H 61/662* (2013.01); *F16H 2059/186* (2013.01); *Y02T 10/40* (2013.01); *Y02T 10/60* (2013.01)

(58) Field of Classification Search
None
See application file for complete search history.

(56) References Cited

U.S. PATENT DOCUMENTS

| 5,944,632 A | 8/1999 | Hara et al. |
| 6,009,365 A | 12/1999 | Takahara et al. |

(Continued)

FOREIGN PATENT DOCUMENTS

JP 2011-231844 11/2011

*Primary Examiner* — Charles A Fox
*Assistant Examiner* — Ryan P Dodd
(74) *Attorney, Agent, or Firm* — Oblon, McClelland, Maier & Neustadt, L.L.P.

(57) ABSTRACT

In a coasting control process, an ECU increases line pressure PL of a hydraulic path to predetermined pressure P1 such that discharge pressure of an MOP becomes higher than that before a C1 clutch is disengaged at timing when an executing condition of coasting control is satisfied (time t=t1). According to such coasting control process, driving torque of the MOP increases, so that deceleration (deceleration G) caused by driving of the MOP by a drive wheel becomes larger than that in conventional coasting control in which the discharge pressure of the MOP is not increased. As a result, it is possible to inhibit a driver from feeling discomfort due to free-running feeling generated during the coasting control.

4 Claims, 6 Drawing Sheets

(56) References Cited

U.S. PATENT DOCUMENTS

| | | | |
|---|---|---|---|
| 6,459,978 B2 | 10/2002 | Taniguchi et al. | |
| 2003/0060330 A1* | 3/2003 | Sato | F16H 61/143 477/174 |
| 2010/0210414 A1* | 8/2010 | Tanaka | B60W 10/10 477/45 |
| 2011/0238248 A1* | 9/2011 | Suzuki | F16H 61/061 701/22 |
| 2013/0260929 A1* | 10/2013 | Aoyama | F16H 9/16 474/29 |
| 2013/0296119 A1* | 11/2013 | Reed | F02P 5/1508 477/5 |
| 2015/0307102 A1* | 10/2015 | Mitsuyasu | B60W 30/18172 701/48 |
| 2016/0052520 A1* | 2/2016 | Yokokawa | B60W 10/023 477/181 |

* cited by examiner

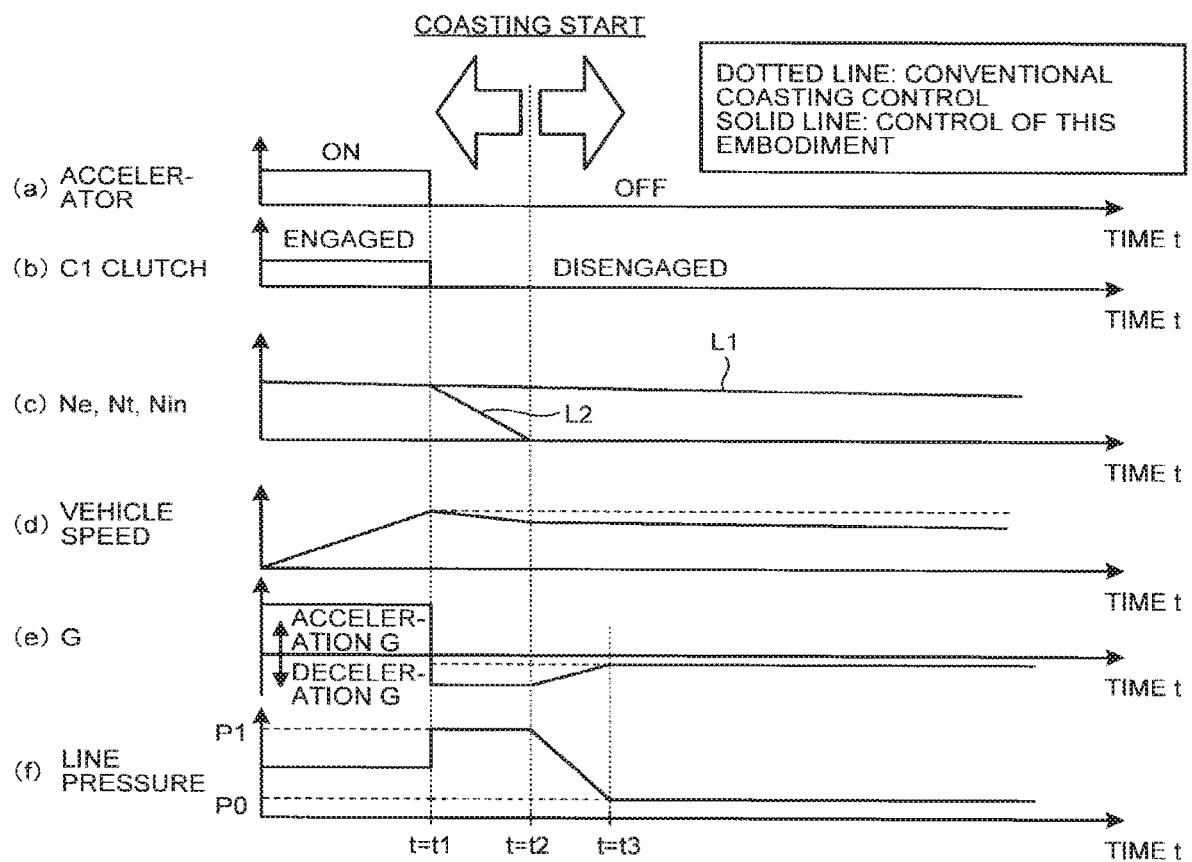

VEHICLE DRIVING DEVICE

CROSS-REFERENCE TO RELATED APPLICATION

The present application claims priority to and incorporates by reference the entire contents of Japanese Patent Application No. 2015-021692 filed in Japan on Feb. 6, 2015.

BACKGROUND OF THE DISCLOSURE

1. Field of the Disclosure

The present disclosure relates to a vehicle driving device capable of selectively driving a mechanical oil pump by an engine or a drive wheel.

2. Description of the Related Art

A vehicle driving device capable of selectively driving a mechanical oil pump by an engine or a drive wheel is conventionally known. Specifically, Japanese Patent Application Laid-open No. 2011-231844 (refer to paragraph 0027) discloses the vehicle driving device which drives the mechanical oil pump by driving force of the drive wheel during coasting in which a clutch provided on a power transmission path between the engine and the drive wheel is disengaged and the engine stops.

In general, during coasting, the clutch provided on the power transmission path between the engine and the drive wheel is disengaged, so that engine braking does not occur. Since driving force is transmitted from the drive wheel to the mechanical oil pump during the coasting, deceleration corresponding to the driving force required for driving the mechanical oil pump is generated on the drive wheel. However, the driving force required for driving the mechanical oil pump becomes smaller because a required hydraulic pressure level is lowered during the coasting. Therefore, the deceleration caused by the driving of the mechanical oil pump by the drive wheel becomes smaller than the deceleration generated during normal traveling in which the clutch is engaged and the engine is driven. As a result, according to the conventional vehicle driving device, a driver might feel discomfort due to free-running feeling generated during the coasting.

BRIEF SUMMARY

It is an object of the present disclosure to provide a vehicle driving device capable of inhibiting the driver from feeling discomfort due to the free-running feeling occurring during the coasting.

A vehicle driving device according to one aspect of the present disclosure is a vehicle driving device of a vehicle including: an engine; a clutch provided on a power transmission path between the engine and a drive wheel; a mechanical oil pump configured to be driven selectively by the engine or the drive wheel and to supply a discharged operation oil to a supplied unit; a hydraulic path connecting the mechanical oil pump to the supplied unit; and a hydraulic pressure adjusting unit configured to adjust a hydraulic pressure of the hydraulic path, wherein the vehicle executes a coasting control configured to disengage the clutch and to stop the engine at a time a coasting executing condition is satisfied during traveling, and the vehicle drives the mechanical oil pump by the drive wheel during the execution of the coasting control, and the vehicle driving device includes a controller configured to increase the hydraulic pressure of the hydraulic path such that a discharge pressure of the mechanical oil pump becomes higher than the discharge pressure before the clutch is disengaged by controlling the hydraulic pressure adjusting unit at the time the coasting executing condition is satisfied and the clutch is disengaged.

That is to say, the vehicle driving device according to the present disclosure makes the discharge pressure of the mechanical oil pump higher than that before the clutch is disengaged when the coasting executing condition is satisfied and the clutch is disengaged. According to, this, driving torque of the mechanical oil pump increases at the time of coasting, so that deceleration caused by the driving of the mechanical oil pump by the drive wheel increases. As a result, it is possible to inhibit a driver from feeling discomfort due to free-running feeling generated during the coasting.

In the vehicle driving device according to the present disclosure, the controller is configured to decrease the hydraulic pressure of the hydraulic path such that the discharge pressure of the mechanical oil pump decreases by controlling the hydraulic adjusting unit after increasing the discharge pressure of the mechanical oil pump.

According to the above-described configuration, it is possible to inhibit deterioration in fuel cost along with the increase in discharge pressure of the mechanical oil pump. It is also possible to inhibit fluctuation in deceleration along with fluctuation in driving torque of the mechanical oil pump by decreasing the discharge pressure of the mechanical oil pump.

According to the vehicle driving device of the present disclosure, it is possible to inhibit the driver from feeling discomfort due to the free-running feeling generated during the coasting.

BRIEF DESCRIPTION OF THE DRAWINGS

FIG. 7 is a timing chart for illustrating the coasting control process being the second embodiment of the present disclosure.

DETAILED DESCRIPTION OF THE PREFERRED EMBODIMENTS

A vehicle driving device being one embodiment of the present disclosure is hereinafter described in detail with reference to the drawings.

Configuration of Vehicle

A configuration of a vehicle to which the vehicle driving device being one embodiment of the present disclosure is applied is first described with reference to FIG. 1.

Figure 1:
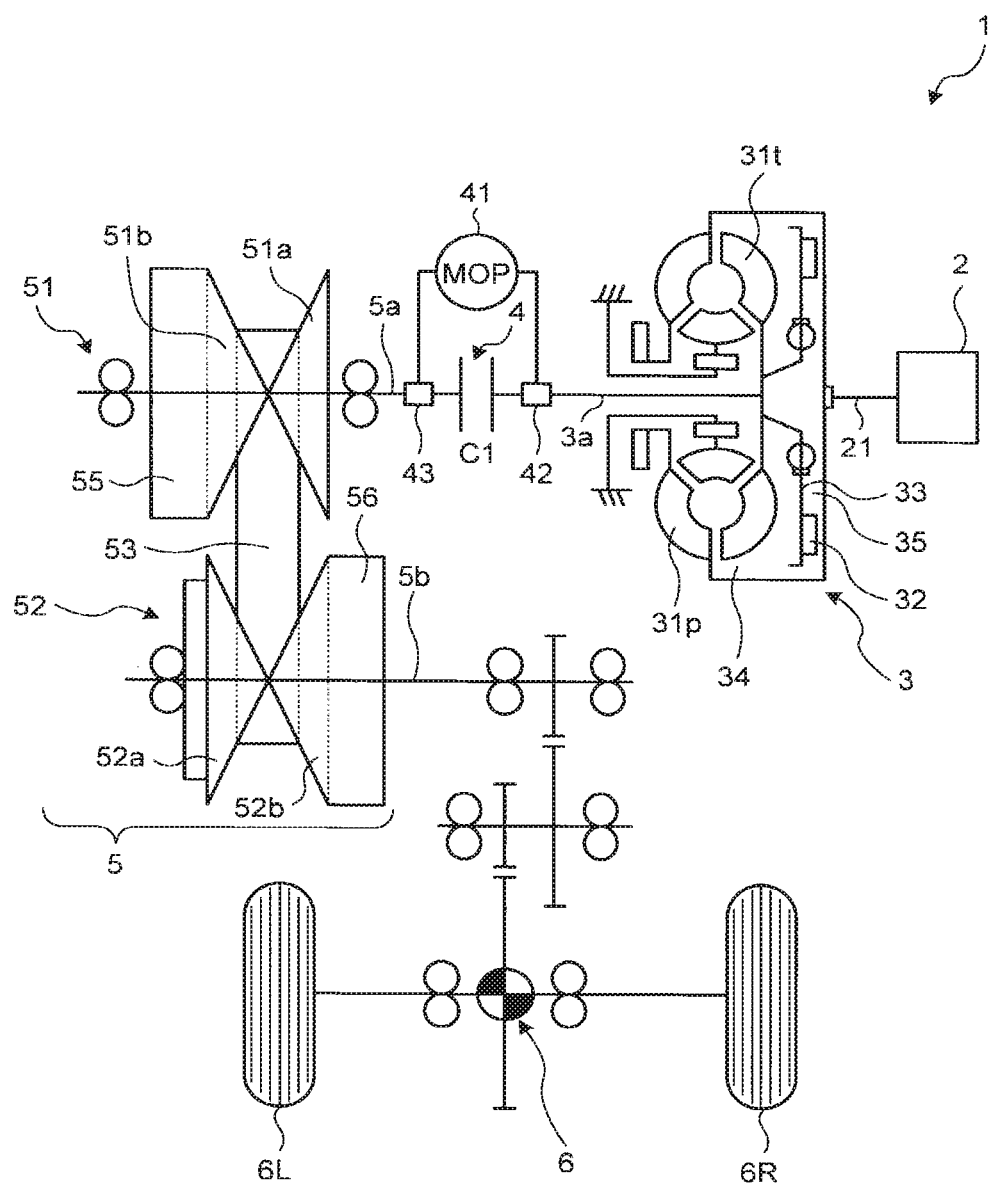
FIG. 1 is a schematic diagram illustrating a configuration of a vehicle to which a vehicle driving device being one embodiment of the present disclosure is applied.

FIG. 1 is a schematic diagram illustrating the configuration of the vehicle to which the vehicle driving device being one embodiment of the present disclosure is applied. As illustrated in FIG. 1, a vehicle 1 to which the vehicle driving device being one embodiment of the present disclosure is applied is provided with an engine 2, a torque converter 3, a C1 clutch 4, a belt-type continuously variable transmission (CVT) 5, and a differential 6.

The engine 2 reciprocates a piston by combustion of mixed gas of fuel gas and air in a combustion chamber to rotate a crankshaft 21 through a connecting rod (not illustrated), thereby transmitting power to the torque converter 3. The power of the engine 2 transmitted to the torque converter 3 is transmitted to the differential 6 through the C1 clutch 4 and the CVT 5 to be distributed to right and left drive wheels 6R and 6L.

The torque converter 3 provided with a pump impeller 31p coupled to the crankshaft 21 and a turbine impeller 31t coupled to a turbine shaft 3a transmits the power through fluid. A lockup clutch 32 is provided between the pump impeller 31p and the turbine impeller 31t. An engagement side oil chamber 34 and a disengagement side oil chamber 35 divided by a piston 33 are formed in the torque converter 3.

The lockup clutch 32 is engaged or disengaged by hydraulic supply switched between the engagement side oil chamber 34 and the disengagement side oil chamber 35. When the lockup clutch 32 is engaged, the crankshaft 21 is directly coupled to the turbine shaft 3a and the power output from the engine 2 is directly transmitted to a CVT 5 side without intervention of the fluid in the torque converter 3. In contrast, when the lockup clutch 32 is disengaged, the power output from the engine 2 is transmitted to the CVT 5 side through the fluid.

The C1 clutch 4 is arranged in series with the lockup clutch 32 on a power transmission path between the turbine shaft 3a and an input shaft 5a of the CVT 5. The C1 clutch 4 is provided with an engine side engaging element coupled to an engine 2 side of the input shaft 5a of the CVT 5 and a drive wheel side engaging element coupled to the drive wheels 6L and 6R side of the input shaft 5a of the CVT 5.

The C1 clutch 4 engages the engine side engaging element with the drive wheel side engaging element to connect the power transmission path between the engine 2 and the drive wheels 6L and 6R. The C1 clutch 4 also disengages the engine side engaging element from the drive wheel side engaging element to block the power transmission path between the engine 2 and the drive wheels 6L and 6R. In other words, the C1 clutch 4 serves as a switching device to switch a state of the power transmission path between the engine 2 and the drive wheels 6L and 6R between a state in which the power may be transmitted and a state in which the power cannot be transmitted.

A mechanical oil pump (MOP) 41 such as a vane pump is provided in parallel to the C1 clutch 4 on the power transmission path between the turbine shaft 3a and the input shaft 5a. The MOP 41 is selectively driven by the engine 2 or the drive wheels 6L and 6R; in more detail, this is driven by one of the turbine shaft 3a and the input shaft 5a with a higher rotational speed by an action of one-way clutches (OWCs) 42 and 43 to supply hydraulic pressure to a hydraulic circuit to be described later. Specifically, during normal traveling in which the C1 clutch 4 is engaged and the engine 2 is driven, the MOP 41 is driven by driving torque of the engine 2 supplied through the OWC 42 provided on the engine 2 side of the C1 clutch 4. During coasting control in which the C1 clutch 4 is disengaged and the driving of the engine 2 is stopped, the MOP 41 is driven by the driving torque of the drive wheels 6L and 6R supplied through the OWC 43 provided on the CVT 5 side of the C1 clutch 4.

The CVT 5 is provided with a primary pulley 51 on an input side having a variable effective diameter, a secondary pulley 52 on an output side having a variable effective diameter, and a metallic transmission belt 53 wound around the pulleys. The CVT 5 transmits the power through frictional force between the primary and secondary pulleys 51 and 52 provided on the input shaft 5a and an output shaft 5b, respectively, and the transmission belt 53. The CVT 5 is connected to the engine 2 through the C1 clutch 4 and the torque converter 3.

The primary and secondary pulleys 51 and 52 are provided with fixed sheaves 51a and 52a fixed to the input shaft 5a and output shaft 5b, respectively, and movable sheaves 51b and 52b provided so as to be relatively unrotatable around shaft centers and movable in axial directions of the input shaft 5a and output shaft 5b, respectively.

The primary and secondary pulleys 51 and 52 are provided with hydraulic actuators 55 and 56 which generate thrust for moving the movable sheaves 51b and 52b in the axial directions, respectively. The hydraulic actuators 55 and 56 are formed of hydraulic cylinders, for example. The secondary pulley 52 may be configured such that return spring is provided in the hydraulic cylinder and spring thrust by the return spring is added to secondary thrust.

The transmission belt 53 is wound around V-shaped pulley grooves formed by the fixed sheaves 51a and 52a and movable sheaves 51b and 52b. The primary and secondary pulleys 51 and 52 continuously change groove widths of the pulley grooves by control of the hydraulic pressure supplied to the hydraulic actuators 55 and 56, respectively. According to this, a winding radius of the transmission belt 53 is changed and a transmission ratio is continuously changed.

Configuration of Hydraulic Circuit

Figure 2:
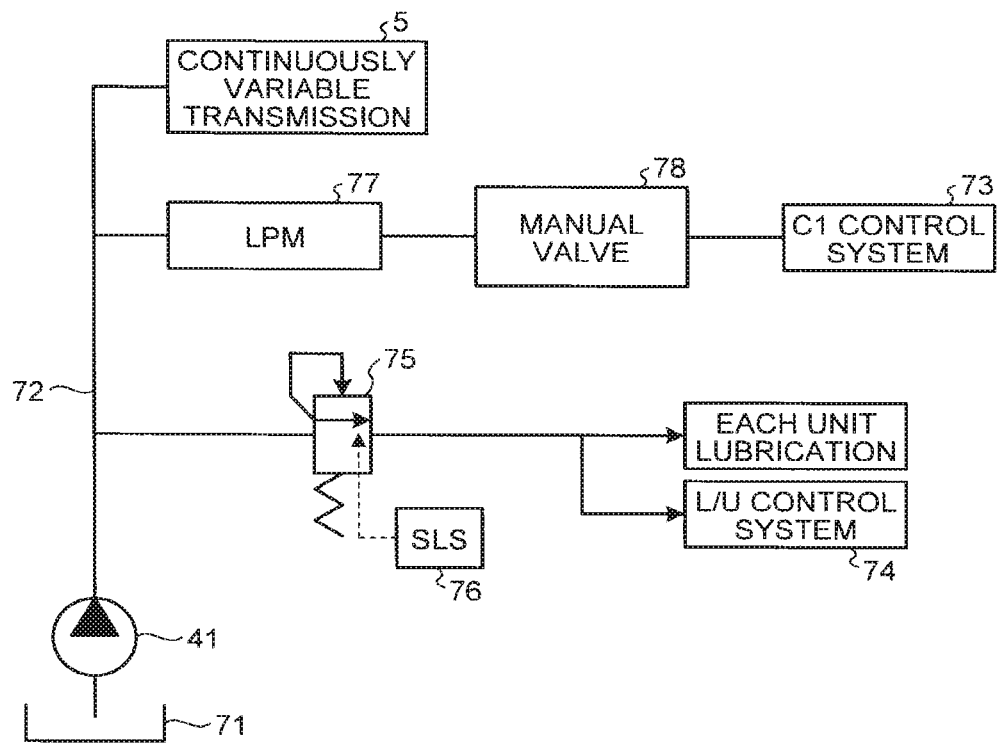
FIG. 2 is a schematic diagram illustrating a configuration of a hydraulic circuit to which a mechanical oil pump supplies hydraulic pressure.

A configuration of the hydraulic circuit to which the MOP 41 supplies the hydraulic pressure is next described with reference to FIG. 2. FIG. 2 is a schematic diagram illustrating the configuration of the hydraulic circuit to which the MOP 41 supplies the hydraulic pressure.

The MOP 41 filters operation oil stored in a drain 71 using a strainer not illustrated and thereafter sucks and compresses the same to discharge, thereby supplying the operation oil to each unit through a hydraulic path 72. A primary regulator valve (line pressure regulating valve) 75 is provided on the hydraulic path 72. The primary regulator valve 75 adjusts the hydraulic pressure generated in the MOP 41. Control pressure is supplied to the primary regulator valve 75 by an SLS linear solenoid 76. The SLS linear solenoid 76 is an electromagnetic valve which generates the control pressure according to a current value determined by a duty signal (duty value) transmitted from an ECU 83 to be described later.

The primary regulator valve 75 adjusts the hydraulic pressure in the hydraulic path 72 according to the control pressure by the SLS linear solenoid 76. The hydraulic pressure in the hydraulic path 72 adjusted by the primary regulator valve 75 is used as line pressure PL. A lockup (L/U) control system 74 which controls engagement/disengagement of the lockup clutch 32 of the torque converter 3, each unit lubrication and the like are connected to an output port of the primary regulator valve 75, and when a surplus flow is generated from the primary regulator valve 75, the surplus flow of which pressure is adjusted is supplied to the L/U control system 74, each unit lubrication and the like.

The MOP 41 is connected to the CVT 5 and a C1 control system 73 which controls engagement/disengagement of the C1 clutch 4 through the hydraulic path 72 so as to be able to supply the hydraulic pressure. A line pressure modulator (LPM) 77 and a manual valve 78 are provided between the hydraulic path 72 and the C1 control system 73 for adjusting the hydraulic pressure supplied to the C1 control system 73, the line pressure modulator 77 and the manual valve 78 controlled by the ECU 83 to be described later.

Figure 3:
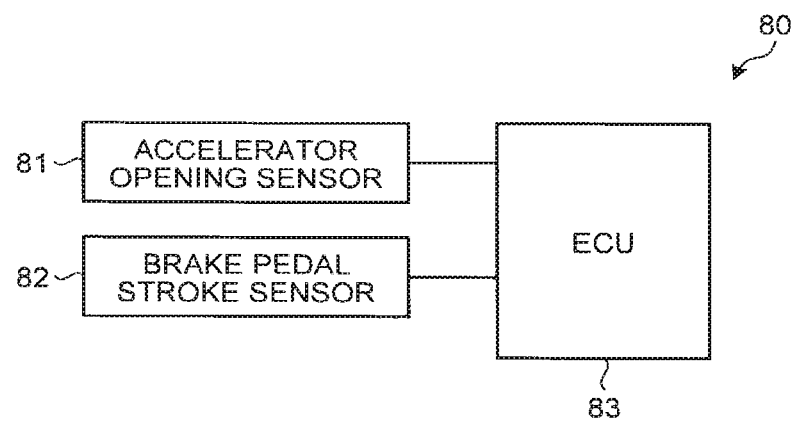
FIG. 3 is a block diagram illustrating a configuration of the vehicle driving device being one embodiment of the present disclosure.

Configuration of Vehicle Driving Device A configuration of the vehicle driving device being one embodiment of the present disclosure is next described with reference to FIG. 3. FIG. 3 is a block diagram illustrating the configuration of the vehicle driving device being one embodiment of the present disclosure.

As illustrated in FIG. 3, a vehicle driving device 80 being one embodiment of the present disclosure is provided with an accelerator opening sensor 81, a brake pedal stroke sensor 82, and an electronic control unit (ECU) 83.

The accelerator opening sensor 81 detects an operation amount of an accelerator pedal (accelerator opening) of the vehicle 1 and outputs an electric signal indicating the detected accelerator opening to the ECU 83.

The brake pedal stroke sensor 82 detects a stroke amount (step amount) of a brake pedal and outputs an electric signal indicating the detected stroke amount to the ECU 83.

The ECU 83 is formed of a microcomputer provided with a central processing unit (CPU), a random access memory (RAM), a read only memory (ROM), an input/output interface and the like. The CPU uses a temporary storage function of the RAM and executes signal processing according to a computer program stored in advance in the ROM. Various control constants and various maps are stored in advance in the ROM.

The ECU 83 controls the vehicle 1 based on the detection signals input from the sensors. The ECU 83 may execute the coasting control by controlling each unit of the vehicle 1. In the coasting control, the ECU 83 automatically stops the engine 2 while the vehicle 1 runs and allows the vehicle 1 to run by inertia. In the coasting control, the C1 clutch 4 is disengaged when the engine 2 stops in order to inhibit transmission of shock due to the stop of the engine 2. In other words, the coasting control is such that the power transmission path between the engine 2 and the CVT 5 is blocked with the C1 clutch 4 disengaged while the vehicle 1 runs, and the vehicle 1 is allowed to run by inertia in a state in which the engine 2 is stopped. According to the coasting control, fuel consumption in the engine 2 stops, so that it is possible to improve fuel efficiency.

The vehicle driving device having such configuration inhibits a driver from feeling discomfort due to free-running feeling generated during the coasting control by executing a coasting control process to be described hereinafter. A flow of the coasting control process by the vehicle driving device being one embodiment of the present disclosure is hereinafter described with reference to FIGS. 4 to 7.

Coasting Control Process

First Embodiment

Figure 4:
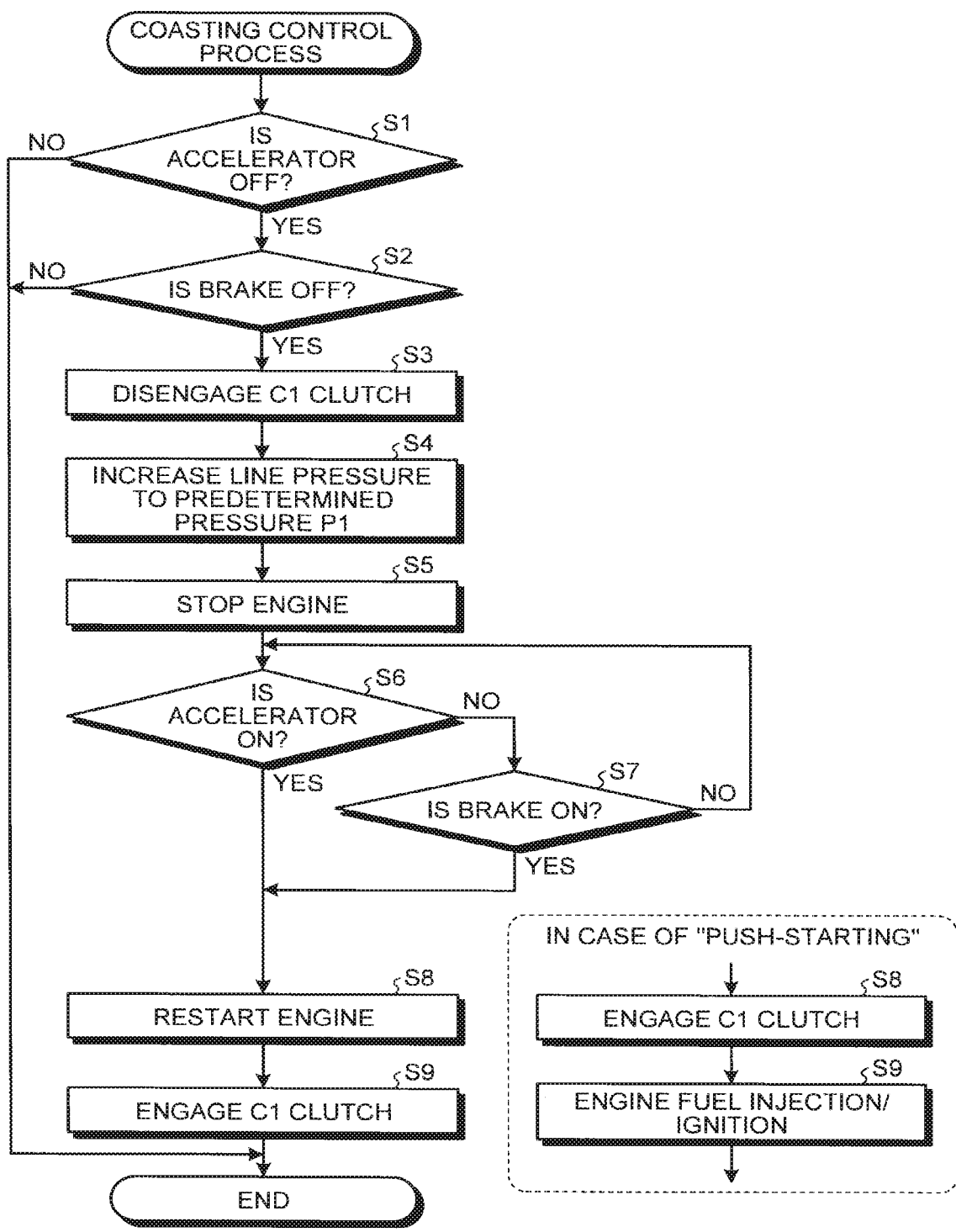
FIG. 4 is a flowchart illustrating a flow of a coasting control process being a first embodiment of the present disclosure.
Figure 5:
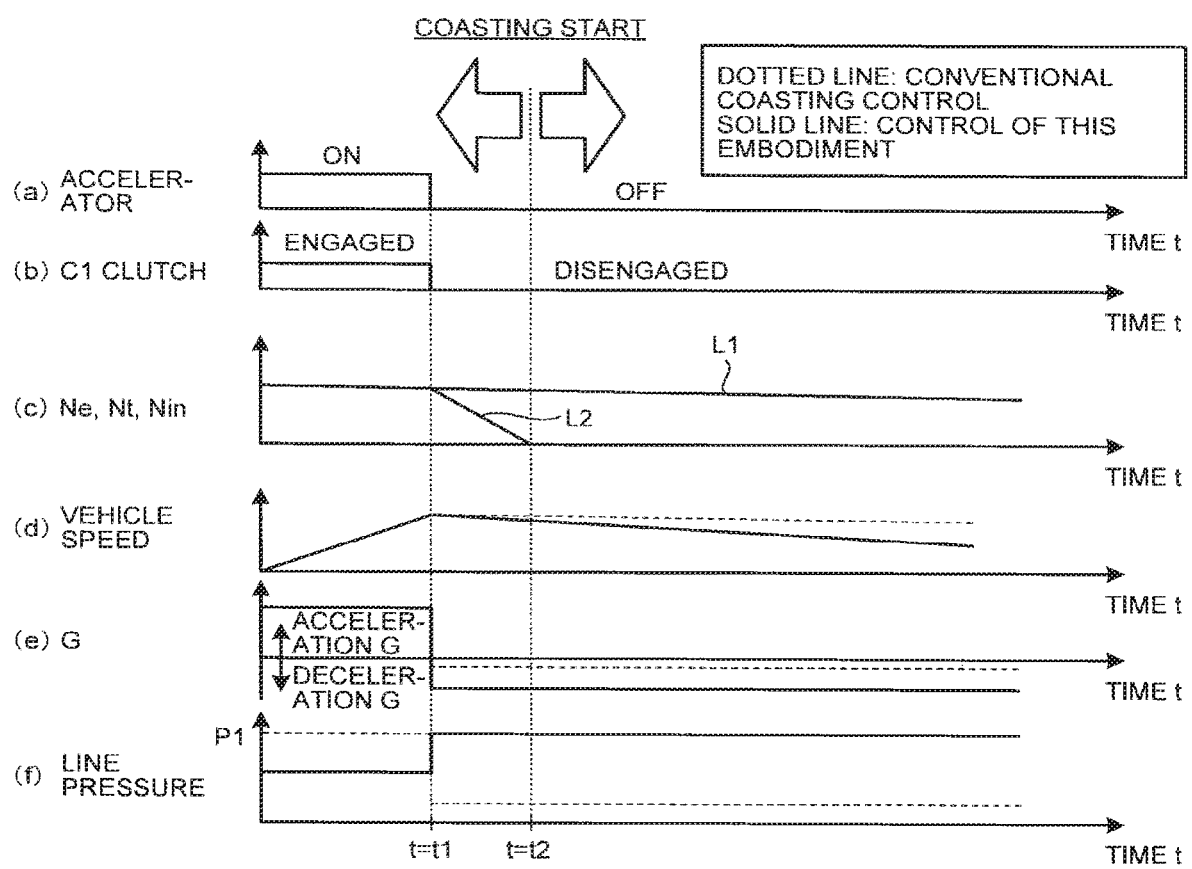
FIG. 5 is a timing chart for illustrating the coasting control process being the first embodiment of the present disclosure.

Operation of a vehicle driving device 80 when a coasting control process being a first embodiment of the present disclosure is executed is first described with reference to FIGS. 4 and 5. FIG. 4 is a flowchart illustrating a flow of the coasting control process being the first embodiment of the present disclosure. FIG. 5 is a timing chart for illustrating the coasting control process being the first embodiment of the present disclosure. Meanwhile, line L1 in FIG. 5(*c*) indicates a rotational speed Nin on an output side of a C1 clutch 4 and line L2 indicates a rotational speed Ne of an engine 2 and a rotational speed Nt on an input side of the C1 clutch 4.

The flowchart illustrated in FIG. 4 starts at timing when a vehicle 1 starts traveling and the coasting control process shifts to a process at step S1. The coasting control process is repeatedly executed at each predetermined control cycle while the vehicle 1 runs.

In the process at step S1, an ECU 83 determines whether accelerator opening is 0 (accelerator OFF) based on an output signal of an accelerator opening sensor 81. As a result of the determination, when the accelerator opening is not 0 (No at step S1), the ECU 83 finishes a series of coasting control processes. In contrast, when the accelerator opening is 0 (Yes at step S1), the ECU 83 shifts the coasting control process to a process at step S2.

In the process at step S2, the ECU 83 determines whether a stroke amount of a brake pedal is 0 (brake OFF) based on an output signal of a brake pedal stroke sensor 82. As a result of the determination, when the stroke amount of the brake pedal is not 0 (No at step S2), the ECU 83 finishes a series of coasting control processes. In contrast, when the stroke amount of the brake pedal is 0 (Yes at step S2), the ECU 83 shifts the coasting control process to a process at step S3.

In the process at step S3, the ECU 83 determines that an executing condition of the coasting control is satisfied to disengage the C1 clutch 4 (time t=t1, refer to FIG. 5(*b*)). According to this, the process at step S3 is completed and the coasting control process shifts to a process at step S4.

In the process at step S4, the ECU 83 increases line pressure PL of a hydraulic path 72 to predetermined pressure P1 such that discharge pressure of an MOP 41 becomes higher than that before the C1 clutch 4 is disengaged (time t=t1, refer to FIG. 5(*f*)). According to this, the process at step S4 is completed and the coasting control process shifts to a process at step S5.

In the process at step S5, the ECU 83 stops driving the engine 2. At timing when the rotational speed Ne of the engine 2 reaches 0 (time t=t2, refer to FIG. 5(*c*)), the vehicle 1 is put into a coasting state. According to this, the process at step S5 is completed and the coasting control process shifts to a process at step S6.

In the process, at step S6, the ECU 83 determines whether the accelerator opening is not 0 (accelerator ON) based on the output signal of the accelerator opening sensor 81. As a result of the determination, when the accelerator opening is 0 (No at step S6), the ECU 83 shifts the coasting control process to a process at step S7. In contrast, when the accelerator opening is not 0 (Yes at step S6), the ECU 83 shifts the coasting control process to a process at step S8.

In the process at step S7, the ECU 83 determines whether the stroke amount of the brake pedal is not 0 based on the output signal of the brake pedal stroke sensor 82. As a result of the determination, when the stroke amount of the brake pedal is not 0 (Yes at step S7), the ECU 83 shifts the coasting control process to the process at step S8. In contrast, when the stroke amount of the brake pedal is 0 (No at step S7), the ECU 83 returns the coasting control process to the process at step S6.

In the process at step S8, the ECU 83 determines that a returning condition from the coasting control to normal traveling control is satisfied and restarts the engine 2 by using known starting means such as a starter and a motor.

According to this, the process at step S8 is completed and the coasting control process shifts to a process at step S9.

In the process at step S9, the ECU 83 engages the C1 clutch 4. According to this, the process at step S9 is completed and a series of coasting control processes are finished.

Meanwhile, although the engine 2 is restarted by using the known starting means in the above-described embodiment, it is also possible to restart the engine 2 by "push-starting" to restart the engine 2 by using driving force of drive wheels 6L and 6R. In this case, as illustrated in a dotted frame in FIG. 4, the ECU 83 engages the C1 clutch 4 in the process at step S8. According to this, the driving force of the drive wheels 6L and 6R is transmitted to a crankshaft 21 of the engine 2 and the rotational speed of the engine 2 increases. Then, in the process at step S9, the ECU 83 restarts the engine 2 by executing fuel injection and ignition control.

In general, a required hydraulic pressure level lowers during the coasting control, so that driving force required for driving the MOP 41 becomes smaller. Therefore, deceleration caused by driving of the MOP 41 by the drive wheels 6L and 6R becomes smaller than the deceleration generated during normal traveling. As a result, a driver might feel discomfort due to free-running feeling generated during the coasting control according to conventional coasting control. In contrast, in the coasting control process being the first embodiment of the present disclosure, as indicated by solid line in FIG. 5(f), the ECU 83 increases the line pressure PL of the hydraulic path 72 to the predetermined pressure P1 such that the discharge pressure of the MOP 41 becomes higher than that before the C1 clutch 4 is disengaged at timing when the executing condition of the coasting control is satisfied (time t=t1). According to such coasting control process, driving torque of the MOP 41 increases, so that the deceleration (deceleration G) caused by the driving of the MOP 41 by the drive wheels 6L and 6R becomes larger than that in the conventional coasting control in which the discharge pressure of the MOP 41 is not increased as is clear from comparison between solid line and broken line in FIG. 5(e). As a result, it is possible to inhibit the driver from feeling discomfort due to the free-running feeling generated during the coasting control.

Second Embodiment

Figure 6:
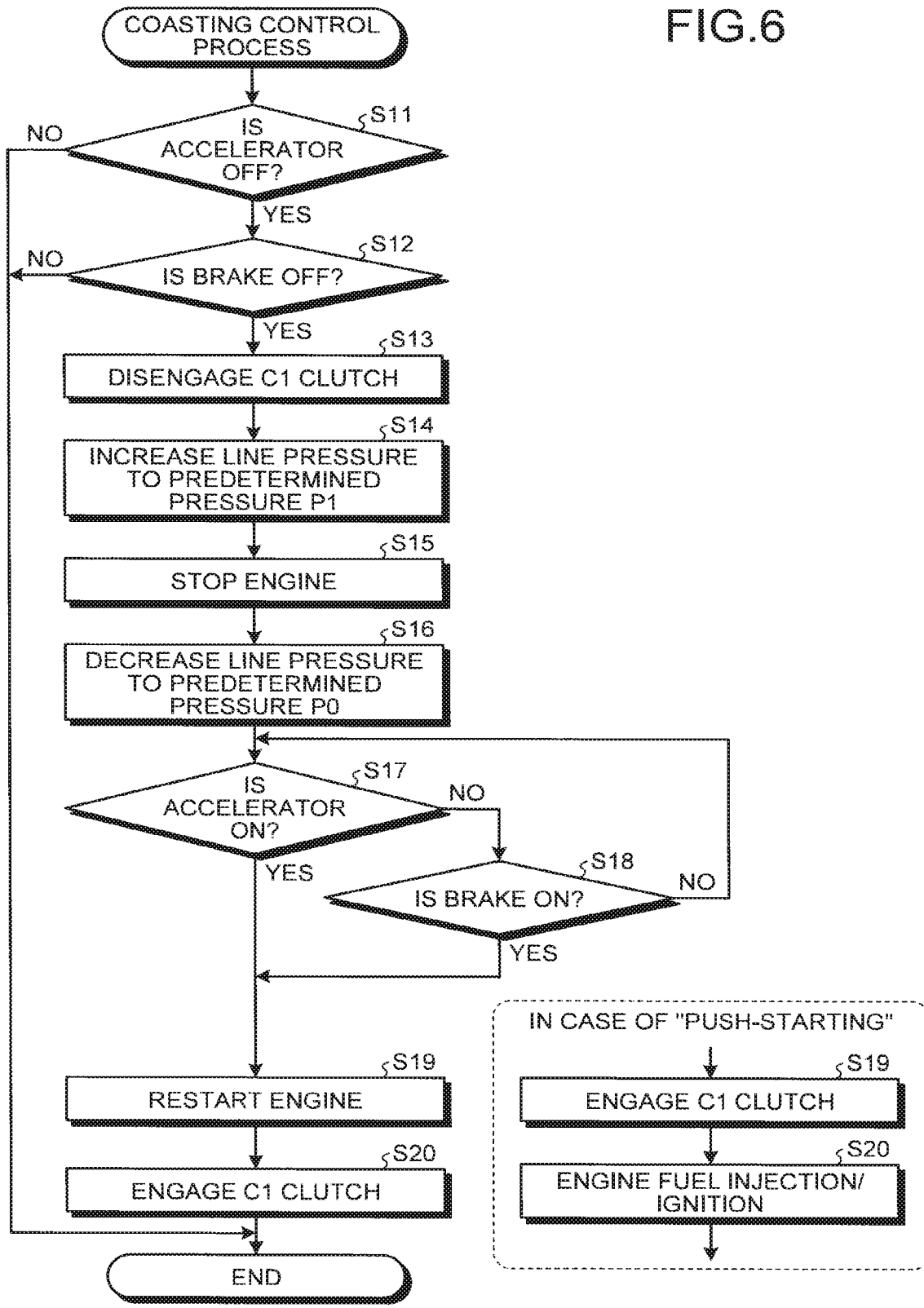
FIG. 6 is a flowchart illustrating a flow of a coasting control process being a second embodiment of the present disclosure.

Operation of a vehicle driving device 80 when a coasting control process being a second embodiment of the present disclosure is executed is next described with reference to FIGS. 6 and 7. FIG. 6 is a flowchart illustrating a flow of the coasting control process being the second embodiment of the present disclosure. FIG. 7 is a timing chart for illustrating the coasting control process being the second embodiment of the present disclosure. Meanwhile, line L1 in FIG. 7(c) indicates a rotational speed Nin on an output side of a C1 clutch 4 and line L2 indicates a rotational speed Ne of an engine 2 and a rotational speed Nt on an input side of the C1 clutch 4.

The flowchart illustrated in FIG. 6 starts at timing when a vehicle 1 starts traveling and the coasting control process shifts to a process at step S11. The coasting control process is repeatedly executed at each predetermined control cycle while the vehicle 1 runs.

In the process at step S11, an ECU 83 determines whether accelerator opening is 0 (accelerator OFF) based on an output signal of an accelerator opening sensor 81. As a result of the determination, when the accelerator opening is not 0 (No at step S11), the ECU 83 finishes a series, of coasting control processes. In contrast, when the accelerator opening is 0 (Yes at step S11), the ECU 83 shifts the coasting control process to a process at step S12.

In the process at step S12, the ECU 83 determines whether a stroke amount of a brake pedal is 0 (brake OFF) based on an output signal of a brake pedal stroke sensor 82. As a result of the determination, when the stroke amount of the brake pedal is not 0 (No at step S12), the ECU 83 finishes the series of coasting control processes. In contrast, when the stroke amount of the brake pedal is 0 (Yes at step S12), the ECU 83 shifts the coasting control process to a process at step S13.

In the process at step S13, the ECU 83 determines that an executing control of the coasting control is satisfied to disengage the C1 clutch 4 (time t=t1, refer to FIG. 7(b)). According to this, the process at step S13 is completed and the coasting control process shifts to a process at step S14.

In the process at step S14, the ECU 83 increases line pressure PL of a hydraulic path 72 to predetermined pressure P1 such that discharge pressure of an MOP 41 becomes higher than that before the C1 clutch 4 is disengaged (time t=t1, refer to FIG. 7(f)). According to this, the process at step S14 is completed and the coasting control process shifts to a process at step S15.

In the process at step S15, the ECU 83 stops driving the engine 2. At timing when the rotational speed Ne of the engine 2 reaches 0 (time t=t2, refer to FIG. 7(c)), the vehicle 1 is put into a coasting state. According to this, the process at step S15 is completed and the coasting control process shifts to a process at step S16.

In the process at step S16 the ECU 83 decreases the line pressure PL of the hydraulic path 72 to predetermined pressure P0 (<predetermined pressure P1) required at the time of coasting control such that the discharge pressure of the MOP 41 decreases (time t=t2 to t3, refer to FIG. 7(f)). According to this, the process at step S16 is completed and the coasting control process shifts to a process at step S17. Processes after step S17 are the same as the processes after step S6 illustrated in FIG. 4, so that the description thereof is hereinafter omitted.

As is clear from the description above, in the coasting control process being the second embodiment of the present disclosure, the ECU 83 increases the discharge pressure of the MOP 41 to the predetermined pressure P1 and thereafter decreases the line pressure PL of the hydraulic path 72 to the predetermined pressure P0 required at the time of coasting control such that the discharge pressure of the MOP 41 decreases. According to such configuration, it is possible to inhibit deterioration in fuel efficiency along with the increase in the discharge pressure of the MOP 41 in addition to an effect by the coasting control process being the first embodiment. It is also possible to inhibit fluctuation in deceleration along with fluctuation in driving torque of the MOP 41 by decreasing the discharge pressure of the MOP 41.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle driving device of a vehicle, the vehicle including: an engine; a clutch provided on a power transmission path between the engine and a drive wheel; a mechanical oil pump configured to be driven selectively by the engine or the drive wheel and to supply a discharged operation oil to a supplied unit; a hydraulic path connecting the mechanical oil pump to the supplied unit; and an ECU configured to adjust a hydraulic pressure of the hydraulic path, the vehicle driving device comprising:

the ECU configured to:

determine a coasting execution condition is satisfied when each of an accelerator and a brake of the vehicle is OFF, execute a coasting control when the coasting executing condition is satisfied during traveling, the coasting control including disengaging the clutch and stopping the engine; and after disengaging the clutch and prior to the engine being stopped when the coasting control executing condition is satisfied during traveling, increase the hydraulic pressure of the hydraulic path such that a discharge pressure of the mechanical oil pump becomes higher when the clutch is disengaged than the discharge pressure of the mechanical oil pump when the clutch is engaged, and wherein the vehicle drives the mechanical oil pump by the drive wheel during the execution of the coasting control.

2. The vehicle driving device according to claim 1, wherein the ECU is configured to decrease the hydraulic pressure of the hydraulic path such that the discharge pressure of the mechanical oil pump decreases after increasing the discharge pressure of the mechanical oil pump.

3. The vehicle driving device according to claim 1, wherein the ECU is configured to restart the engine when the coasting executing condition is not satisfied.

4. The vehicle driving device according to claim 1, wherein the coasting executing condition is satisfied when an accelerator opening is zero and a stroke amount of a brake pedal is zero.

* * * * *